Nov. 2, 1943.    A. H. LUNDIUS    2,333,260
ADAPTER FOR WORK STOCK
Filed March 11, 1939

INVENTOR:
ALTON H. LUNDIUS,
BY Gales P. Moore
HIS ATTORNEY.

Patented Nov. 2, 1943

2,333,260

UNITED STATES PATENT OFFICE 2,333,260

ADAPTER FOR WORK STOCK

Alton H. Lundius, South Orange, N. J., assignor to General Motors Corporation, Detroit, Mich., a corporation of Delaware Application March 11, 1939, Serial No. 261,361

13 Claims. (Cl. 29—58)

This invention relates to adapters for work stock in automatic screw machines and the like and comprises all of the features of novelty herein disclosed. An object of the invention is to provide an improved device and method whereby waste at the butt ends of tubing and other work stock can be minimized. Another object is to provide a combined plug for closing the butt end of a tube and an adapter to enable the tube to be fed farther forward in a work spindle. Another object is to provide a dummy work extension whereby a short length of tubular work stock can be reliably held in a chuck for machining operations.

To these ends and also to improve generally upon devices of this character, the invention consists in the various matters hereinafter described and claimed. In the drawing, Fig. 1 is a longitudinal sectional view of the adapter.

Figure 1:
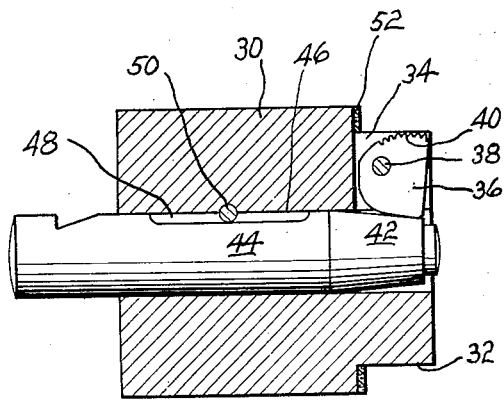
Figure 2:
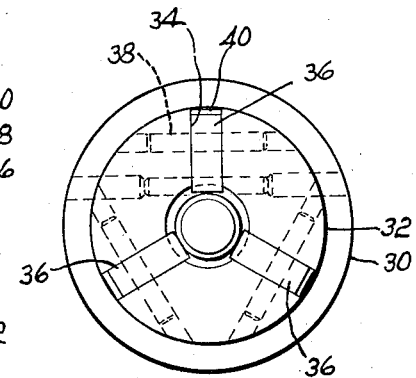
Fig. 2 is an end view of Fig. 1.

The numeral 10 indicates a spindle adapted to be journalled for rotation in the frame of an automatic screw machine or other chucking machine which feeds long bars or tubes to machining and cut-off tools. The spindle has the usual tapered surface 12 to engage a similar surface on a split collet 14 carried by a sleeve section 16 threaded on a slidable sleeve 18. This sleeve is actuated intermittently to cause the collet to contract upon the work stock for the machining and cut-off operations or to expand and release the work stock whenever the work stock is advanced for machining of the next piece. Slidable within the sleeve 18 is a feed sleeve 20 having a forward section 22 which is split as at 24 to form resilient feeding fingers. These fingers normally bear against the outer surface of the work stock and advance it periodically whenever the collet 14 has released the stock. All of the foregoing apparatus is well known and is merely illustrative of a machine to which the invention can be applied. It will be understood that the stock is originally in the form of a long sleeve or tube which is introduced from the rear end of the sleeve 20 and that T represents the remnant or wasted butt end remaining after the last work piece has been cut off, as by cut-off tool C. As will appear, this remnant or waste would be much longer in the absence of the new adapter.

Figure 3:
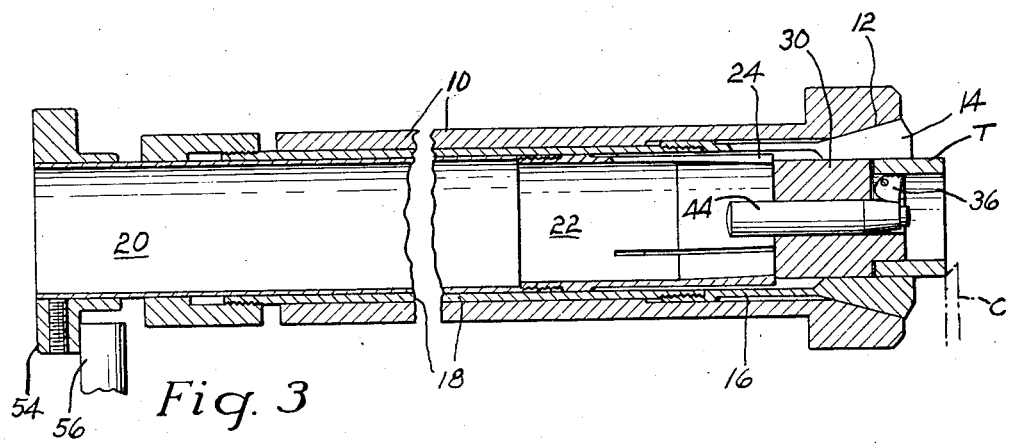
Fig. 3 is a longitudinal sectional view showing the adapter in its final position within the work spindle of an automatic screw machine or the like, after the last piece is cut from the stock.

The adapter comprises a body 30 of generally cylindrical form with a reduced extension or nose 32 which is radially slotted at 34 to receive clamping dogs or cams 36. Each clamping member or cam is pivoted upon a pin 38 located so that the free end of each member is near the end of the adapter so that the gripping part will swing outwardly with a component axially. Each clamping member has an outer rounded portion which is toothed or serrated as at 40 to grip the interior of the original long tube at the butt end. Such butt end and adapter then occupy a position to the left of Fig. 3. To effect spreading of the cams, a conical cam surface 42 on a pin 44 is adapted to be driven axially into them, the pin 44 sliding in a bore 46 of the adapter body 30 which closely fits it. To prevent loss of the pin 44 and yet allow shifting thereof, the pin is notched at 48 and cooperates with a retaining stop pin 50. A soft washer 52 of felt or the like is interposed between the end of the tube and a shoulder on the adapter 30. This forms a tight joint to prevent leakage of cooling compound into the spindle. To prevent overfeeding of the stock, a collar 54 on the feed sleeve 20 is adapted to engage a fixed stop pin 56. The adapter body 30 preferably has the same diameter as the outside diameter of the stock while the nose 32 is smaller than the internal diameter.

In operation, the adapter nose 32 is inserted in the rear end of the original long tube constituting the work stock and the pin 44 is hammered endwise. This swings the gripping members 36 and expands them on the interior of the tube, the tube also being forced tight against the washer 52. The stock tube is thus closed at the rear end and the adapter constitutes a dummy extension of the work. The machine operates in the usual way to advance the stock intermittently to the tools which machine and cut off the articles one by one until the rear end of the tube passes the forward limit of movement of the feeding fingers 24. Then the adapter itself is engaged by the feeding fingers and the butt end of the tube is advanced to the position shown in Fig. 3 wherein the last finished piece has been cut off by the cut-off tool C. The only waste in the stock is the length from the cut-off tool to the washer 52 but, in the absence of the adapter, the waste or remnant would be the distance from the cut-off tool to the end of the feeding fingers 24. In the final position shown, a portion of the stock and a portion of the adapter are gripped externally by the chuck and the adapter grips the work internally so that only a small length of the original tube projects into the chuck. When the waste length is removed from the machine, the adapter is released therefrom for repeated use by striking the forward end of the pin 44 or pulling on the hooked rear end to release the gripping members.

I claim:

1. In a device of the character indicated, a work spindle having work feeding means to advance a length of tubular work stock therein, in combination with an adapter plugging the end of the tubular stock and having means to secure it to the end of the stock to form a connected extension of the stock; substantially as described.

2. In a device of the character indicated, an adapter having means to secure it to the end of a workpiece as a connected extension thereof, and a chuck having clamping means to grip a portion of the work and a portion of said attached extension; substantially as described.

3. The method of advancing work stock in a work spindle having reciprocating feeding means and a chuck, which consists in removably attaching an extension to the rear end of each length of stock, utilizing the attached extension as a pusher to project the rear end of the stock beyond the feeding means when the latter advances, and utilizing the chuck to grip the stock and thereby prevent retrograde movement of the attached extension when the feeding means retreats; substantially as described.

4. In a device of the character indicated, an adapter having substantially the same external size at its largest portion as a length of work stock with no parts projecting radially beyond the stock, and means for rigidly securing the adapter to the end of the stock as a feeding extension thereof; substantially as described.

5. In a device of the character indicated, a stock feeding adapter having a body portion to form a dummy extension of a length of tubular work stock, all portions of the adapter being contained within a space no greater than the external diameter of the work stock for feeding movement with the stock through a chucking spindle, and means engaging the interior of the stock for securing the adapter thereto; substantially as described.

6. In a device of the character indicated, a stock feeding adapter having substantially the same maximum external diameter as the external diameter of a length of tubular work stock, and means for securing the adapter to the end of the tubing as an extension thereof to be fed therewith through a chucking spindle; substantially as described.

7. In a device of the character indicated, a stock feeding aadpter having substantially the same maximum external diameter as the external diameter of a length of tubular work stock, means for securing the adapter in abutting relation to the end of the tubing for feeding therewith through a chucking spindle, and means carried by the adapter to engage and plug said end of the tubing to avoid leakage of cooling fluid; substantially as described.

8. In a device of the character indicated, a stock feeding adapter having a body portion to form a dummy extension of a length of work stock, all portions of the adapter being contained within a space no greater than the external diameter of the work stock for feeding movement therewith through a chucking spindle, work gripping means movably mounted on the adapter, and means for actuating said means to grip the stock; substantially as described.

9. In a device of the character indicated, a stock feeding adapter having a body portion to form an extension of a length of work stock, work gripping means pivoted to the adapter, and means for swinging said members in a direction to cause them to grip the stock while also causing tight axial engagement between the body portion and the end of the stock; substantially as described.

10. In a device of the character indicated, a stock feeding adapter having a body portion to form an extension of a length of work stock, work gripping members pivoted to the adapter in a location to have their free ends near the end of the adapter, and a pin shiftable towards the same end of the adapter and having a tapered surface to cause the gripping members to grip the stock; substantially as described.

11. In a device of the character indicated, a stock feeding adapter having a body portion to form an extension of a length of tubular work stock, the adapter having a nose portion to enter the stock, and expansible gripping members mounted on the nose portion to grip the interior of the stock, the outer portions of the gripping members being movable towards the body portion to also cause axial approach between the body portion and the stock; substantially as described.

12. In a device of the character indicated, a stock feeding adapter having a body portion to form an extension of a length of tubular work stock, the adapter having a nose portion forming a shoulder with the body portion and entering the stock, a compressible washer engaging the shoulder and the end of the stock, and means for clamping the adapter to the stock and drawing the stock towards the shoulder to compress the washer; substantially as described.

13. In a device of the character indicated, a stock feeding adapter having a body portion to form an extension of a length of tubular work stock, the adapter having a nose portion entering the stock and having radial slots, work gripping members pivoted in said slots, and a driving pin slidable axially in the adapter and having a cam surface to expand said gripping members against the interior of the stock; substantially as described.

ALTON H. LUNDIUS.